US006985535B2

(12) United States Patent
Park et al.

(10) Patent No.: US 6,985,535 B2
(45) Date of Patent: Jan. 10, 2006

(54) CHANNEL CONDITION ESTIMATION FOR PILOT COEFFICIENT SELECTION

(75) Inventors: Young-Seo Park, Sunrise, FL (US); Darrell J. Stogner, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 121 days.

(21) Appl. No.: 10/699,015

(22) Filed: Oct. 31, 2003

(65) Prior Publication Data

US 2005/0094738 A1    May 5, 2005

(51) Int. Cl.
    *H04K 1/10*         (2006.01)
(52) U.S. Cl. ................. 375/260; 375/324; 370/252
(58) Field of Classification Search ............. 375/324, 375/340, 342, 147, 148, 260; 370/334, 335, 370/342, 252
    See application file for complete search history.

(56) References Cited

U.S. PATENT DOCUMENTS

| 5,140,615 | A |   | 8/1992  | Jasper et al.   |         |
|-----------|---|---|---------|-----------------|---------|
| 5,241,544 | A |   | 8/1993  | Jasper et al.   |         |
| 5,406,585 | A |   | 4/1995  | Rohani et al.   |         |
| 5,414,734 | A | * | 5/1995  | Marchetto et al. | 375/267 |
| 5,848,357 | A |   | 12/1998 | Dehner et al.   |         |
| 5,875,215 | A | * | 2/1999  | Dobrica         | 375/344 |
| 6,137,788 | A | * | 10/2000 | Sawahashi et al. | 370/342 |
| 6,141,393 | A |   | 10/2000 | Thomas et al.   |         |
| 6,192,040 | B1|   | 2/2001  | Jalloul et al.  |         |
| 6,208,632 | B1| * | 3/2001  | Kowalski et al. | 370/335 |
| 6,298,094 | B1|   | 10/2001 | Dehner et al.   |         |
| 6,424,678 | B1|   | 7/2002  | Doberstein et al. |       |
| 2004/0013172 | A1| * | 1/2004 | Hashiguchi et al. | 375/148 |

OTHER PUBLICATIONS

James K. Cavers, "An Analysis of Pilot Symbol Assisted Modulation for Raleigh Fading Channels," IEEE Transactions on Vehicular Technology, Nov. 1991, pp. 686-693.
Haiyun Tang, Kam Y. Lau, & Robert W. Brodersen, "Interpolation-Based Maximum Likelihood Channel Estimation Using OFDM Pilot Symbols," Berkeley Wireless Research Ctr., undated.
Ivan Perisa, Jochem Egle & Jurgen Lindner, "Channel Estimation with Pilot-Symbols over WSSUS Channels," Univ. of Ulm (Germany), Dept. of Information Technology, undated.

* cited by examiner

*Primary Examiner*—Temesghen Ghebretinsae

(57) ABSTRACT

A multi-carrier modulation communications system and method (100) for providing channel estimation that uses a transmitter for inserting pilot symbols in a digital multi-carrier modulated radio frequency (RF) signal and a receiver for receiving the pilot symbols in multi-carrier modulation RF signal. In order to provide channel estimation the receiver detects (101) channel power gains from a plurality of designated pilot symbols and calculates (103) both a speed parameter (S) and a multi-path parameter (M) for the channel receiving the pilot symbols. A channel model is then defined (105) based upon the speed parameter and multi-path parameter value and a predefined set of pilot coefficients is chosen (107) that substantially matches the channel model. The resulting set of pilot coefficients is then utilized (109) for optimizing pilot symbol interpolation.

9 Claims, 2 Drawing Sheets

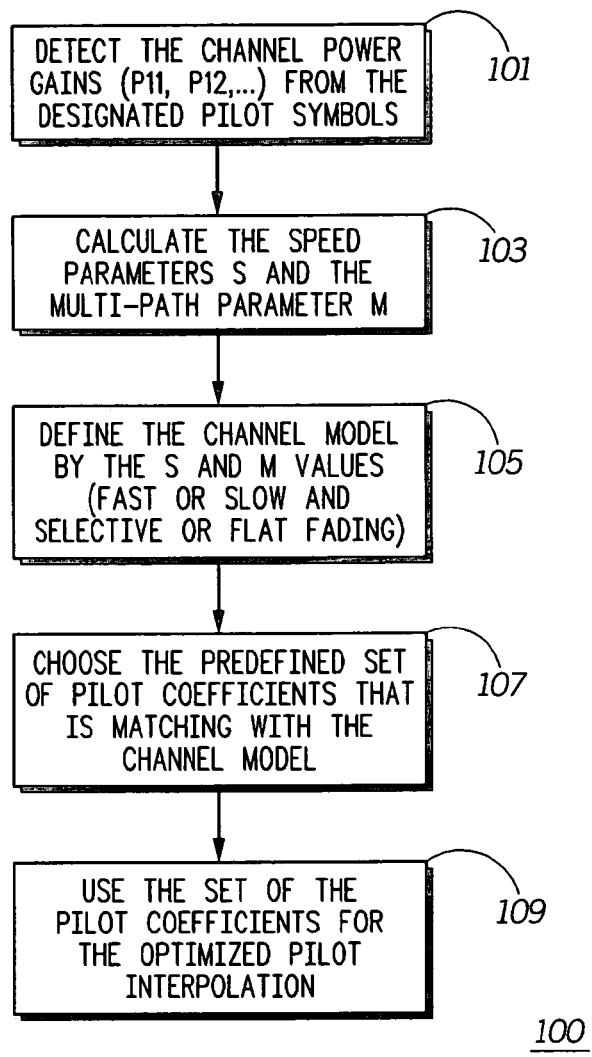

FIG. 1

```
BAUD #      1111111111222222222233333333334444444455
       12345678901234567890123456789012345678901234567812

PTxxPxxxxxxxxxxxPxxxxxxxxxxxPxxxxxxxxxxxPxxxxxxxTP   SUB-CH1
TTxxxxxxxxxTxxxxxxxxxxxTxxxxxxxxxxxTxxxxxxxxxxxTxTT  SUB-CH2
PTxxPxxxxxxxxxxxPxxxxxxxxxxxPxxxxxxxxxxxPxxxxxxxTP   SUB-CH3
TTxxxxxxxxxTxxxxxxxxxxxTxxxxxxxxxxxTxxxxxxxxxxxTxTT  SUB-CH4
*****************************************************  MIRROR LINE
TTxxxxxxxxxTxxxxxxxxxxxTxxxxxxxxxxxTxxxxxxxxxxxTxTT  SUB-CH5
PTxxPxxxxxxxxxxxPxxxxxxxxxxxPxxxxxxxxxxxPxxxxxxxTP   SUB-CH6
TTxxxxxxxxxTxxxxxxxxxxxTxxxxxxxxxxxTxxxxxxxxxxxTxTT  SUB-CH7
PTxPxxxxxxxxxxxPxxxxxxxxxxxPxxxxxxxxxxxPxxxxxxxTP    SUB-CH8
```

FIG. 2

CHANNEL CONDITION ESTIMATION FOR PILOT COEFFICIENT SELECTION

TECHNICAL FIELD

This invention relates in general to two-way radio communications and more particularly to the estimation of channel conditions using pilot symbols in digital two-way radio communications.

BACKGROUND

Protocols used to transmit digital data typically may use some form of multi-carrier modulation such as orthogonal frequency division multiplexing (OFDM) or scalable adaptive modulation (SAM). As is known by those skilled in the art, multicarrier modulation schemes often use some sort of pilot symbols that are embedded within the transmitted waveform. The pilot symbols are typically used for channel quality estimation such that various parameters of a transmitted signal can be controlled depending on the received signal conditions on that particular channel. In a wireless communications environment, channel conditions vary over both time and frequency. It is important for any wireless communications system to be able to overcome varying channel conditions and estimate received symbols accurately. Typically, multicarrier modulation schemes employ methods of pilot interpolation to determine the effect of the channel gain on each data symbol. In the multicarrier transmitter, pilot symbols are inserted into the data stream at regular intervals in all the subchannels. The receiver uses the received pilot symbols to estimate changing channel conditions. If $P_T$ is a transmitted pilot symbol and $P_R$ is the value of the corresponding received pilot symbol, then the relationship between $P_T$ and $P_R$ can be described by the equation $P_R=(g)(P_T)$ where g represents the complex gain. Knowing the values of $P_R$ and $P_T$, it is easy to obtain g for each transmitted pilot symbol.

$$g=P_R/P_T$$

Pilot interpolation is the name given to an algorithm that is used to determine the effect of the channel on its data symbols based upon a series of received pilot symbols. In other words, the pilot interpolation is to compute the value of complex gain for each received pilot symbol and interpolate the value of the complex gain and obtain gain for the data symbols. Once the gain for each data symbol is obtained, the data symbols are scaled by the gain and passed on to a hard/soft decision decoder. In most multicarrier type modulations, the complex gain (g) includes both the effect of the channel and the phase offset effects from the mixers. As known by those skilled in the art, the pilot interpolation algorithm used in SAM and other multicarrier modulation schemes uses a weighted combination of pilots in the same and adjacent sub-channels to estimate the channel effect. The sync symbols (which occupy the first two bauds across all sub-channels) are also used in the pilot interpolation process.

As the pilot symbols are received at a receiver an associated algorithm is used to produce a set of interpolation coefficients. These coefficients are in turn used to determine how to process and/or interpret the incoming data for a given set of parameters. This allows the incoming data to be processed with the least amount of errors for a set of given conditions. As known to those skilled in the art, changes due to channel fading are typically due to variations in time and in frequency. Typically, only one set of coefficients is used for all fading channel conditions including both fast and slow channel fading as well as any changes in frequency such as flat fading and selective fading. The use of only one set of channel coefficients can impose problems when the receiver is moving at various speeds that cause these varying signal conditions. For example, one coefficient set often does not work well when the receiver moves from a stationary position to various speeds such as 5 kph, 70 kph and/or 200 kph. This type of scenario might be one that would be encountered in a helicopter or other vehicle having a wide range of speeds. The problem in making a channel estimation calculation centers around determining a method to obtain the channel information such as vehicle speed and fading selectivity. The global positioning system (GPS) can be a solution where a vehicle's speed can selectively be calculated from its movement and location. However, methods using GPS are neither easy to implement nor are they cost effective.

Thus, the need exists for a method to measure given signal conditions and the selection of an appropriate set of pilot coefficients based upon channel estimation without using GPS.

SUMMARY OF THE INVENTION

In the pilot interpolation aided system such as SAM, generally a default set of pilot coefficients is used for any channel. But the block error rate (BLER) performance of SAM and other multicarrier modulation systems can be improved approximately 1–2 dB when the set of pilot coefficients is optimized for the current fading channel. Thus, it is often helpful to utilize several sets of pilot coefficients that are optimized for the several representative channel conditions. Therefore, the invention sets forth a method for selecting several sets of pilot coefficients that are optimized for the several representative channels. Since previous problems existed with obtaining vehicle speed and fading selectivity, the present invention estimates this information from an existing channel gain (in power) matrices of pilot symbols. The selectivity can be easily estimated by calculating a channel gain matrix in a time slot. Generally, it is the high selective fading channel if the channel gains are high. However, it also can be estimated more accurately by measuring the element change of a channel gain vector of each baud. It is the high selective fading channel (~HT) if the element change is large in frequency. Then, it must be a low selective fading channel (~TU or Flat) if the element change is small in frequency. A vehicle's speed can be estimated from the channel gain vector of each subchannel. The speed is high (~200 kph) if the element change of the vector is large in time. Similarly, the speed must be low (~50 kph) if the element change is small in time.

BRIEF DESCRIPTION OF THE DRAWINGS

The features of the present invention, which are believed to be novel, are set forth with particularly in the appended claims. The invention, together with further objects and advantages thereof, may best be understood with reference to the following description, taken in conjunction with the accompanying drawings, in the several figures of which like reference numerals identify like elements, and in which:

FIG. 1 is a flow chart diagram illustrating the method for channel condition estimation for pilot coefficient selection in accordance with the preferred embodiment of the invention.

FIG. 2 is a diagram illustrating a data slot format of a multi-carrier system including the pilot symbol positions.

DETAILED DESCRIPTION OF THE PREFERRED EMBODIMENT

Figure 3:
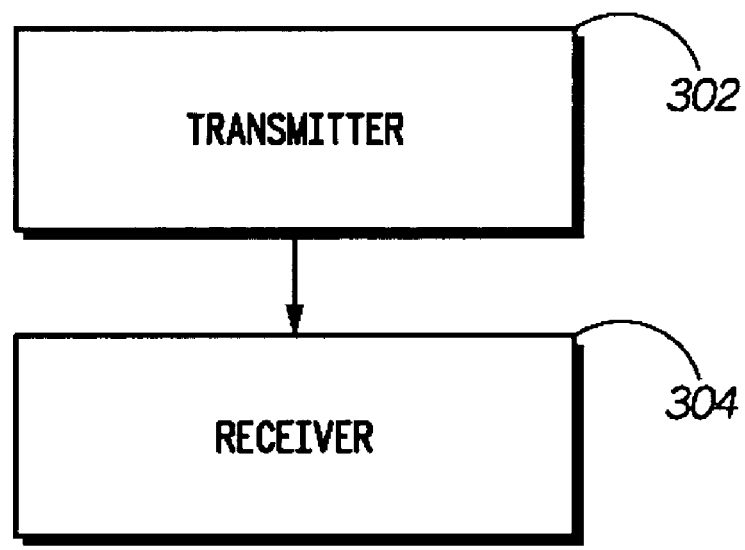
FIG. 3 is a communication system operating in accordance with the present invention.

While the specification concludes with claims defining the features of the invention that are regarded as novel, it is believed that the invention will be better understood from a consideration of the following description in conjunction with the drawing figures, in which like reference numerals are carried forward.

With regard to FIG. 1, a flowchart diagram illustrating the preferred method of the invention 100 includes detecting 101 the channel power gains from the designed pilot symbols then calculating 103 the speed parameter (S) and the multi-path parameter (M) as discussed herein. A channel model is then defined 105 by the speed parameter and multi-path parameter values and a predefined set of pilot coefficients is chosen 107 that is matched with the channel model. That set of pilot coefficients is then used 109 for the optimized pilot interpolation in order to provide the best data reception based on the optimally estimated channel characteristics.

FIG. 2 illustrates a typical data slot format of a multi-carrier system including its pilot positions. The following channel estimation equations are examples for this specific data slot in the 50 kHz SAM of the telecommunications infrastructure standard (TIA). This data slot format includes 8 sub-channels and 52 symbols (bauds). As seen in the figure, the "x" represents a data symbol and the "T" and "P" represent pilot symbols. The pilot symbols of the first two and the last two bauds are also used as a synchronization symbol. In accordance with the invention, the channel gain of the "P" pilot symbol can be estimated using the channel condition algorithm. Thus, the optimized set of pilot coefficients for the current fading channel can be selected for the effective pilot interpolation. Although "P" is only a portion of the pilot symbols, it may make up the entire portion of the pilot symbols as needed.

Thus, the present invention defines a channel estimation method using existing channel gain matrices of pilot symbols that are easily determinable and cost effective. In accordance with the preferred method of the invention, two main parameters are required to be estimated. The first is a speed parameter to determine the existence of either fast fading or slow fading. The second is a multipath parameter to measure the degree of frequency selectivity. The hilly terrain (HT) parameter occurs when frequency selectivity is high and a typical urban (TU) occurs when the frequency selectivity is relatively low. Thus, the speed parameter and the multipath parameter are high for HT200 and the speed parameter and the multipath parameter are low in TU50.

For example, the speed parameter and the multipath parameter can be measured in scalable adaptive modulation (SAM) having 50 kHz bandwidth system as follows. The complex gains (g) for each pilot "P" in FIG. 2 can be calculated through the previous equation, where P11 to P46 represent the power gains (amplitude square of g) for each pilot. Thus, the channel gain matrix of SAM 50 kHz in power is:

$$P = \begin{bmatrix} P11 & P12 & P13 & \cdots & P16 \\ P21 & P22 & P23 & \cdots & P26 \\ P31 & P32 & P33 & \cdots & P36 \\ P41 & P42 & P43 & \cdots & P46 \end{bmatrix}$$

Then, the channel gain change vector in time is $$B = \begin{bmatrix} |P12-P11|+|P13-P12|+\cdots+|P16-P15| \\ |P22-P21|+|P23-P22|+\cdots+|P26-P25| \\ \cdots \quad \cdots \quad \cdots \\ |P42-P41|+|P43-P42|+\cdots+|P46-P45| \end{bmatrix} = \begin{bmatrix} B1 \\ B2 \\ B3 \\ B4 \end{bmatrix}$$

Then, the speed parameter is just $$S = B1 + B2 + B3 + B4$$

When 2 levels should be selected in time, the decision is determined by:

If S>α, the channel is fast fading and if S≤α, the channel is slow fading.

Similarly, when 3 levels should be selected in time, the decision is determined by:

If S>α1, the channel is fast fading, if α1≥S>α2, the channel is middle fading, and if S≤α2, the channel is slow fading.

This process is easily determined so that the level of fading can be estimated in every slot without a considerable increase in complexity. For the multipath parameter, the channel gain change vector in frequency is determined by:

$$C = \begin{bmatrix} |P21-P11|+|P31-P21|+|P41-P31| \\ \cdots \\ |P26-P16|+|P36-P26|+|P46-P36| \end{bmatrix} = \begin{bmatrix} C1 \\ C2 \\ \cdots \\ C6 \end{bmatrix}$$

Finally, the multipath parameter is calculated using the equation:

$$M = C1 + C2 + C3 + C4 + C5 + C6$$

The decision logic of the multipath parameter is the same in the speed parameter. If there are three (3) levels in the time parameter and two (2) levels in the multipath parameter, then it follows that six different channel conditions can be estimated using this type of matrix. The performance of a SAM 50 kHz system can be improved substantially when there are only two sets of pilot coefficients for the fast fading and the slow fading. However, those skilled in the art will recognize that additional pilot sets are recommended to maximize this performance when taking into account the trade offs between the complexity and the improvement in bit error rate (BER).

In summary the present invention provides a system and method wherein a multi-carrier modulation communications system is used for providing channel estimation. The system and method include a transmitter 302 shown in FIG. 3 for inserting pilot symbols in a digital multi-carrier modulated radio frequency (RF) signal and a receiver 304 for receiving the pilot symbols in a multi-carrier modulation RF signal. The receiver 304 works to detect channel power gains from a plurality of designated pilot symbols and then calculates a speed parameter (S) and a multi-path parameter (M) for the channel receiving the pilot symbols. A channel model is next defined based upon the speed parameter and multi-path parameter value and a predefined set of pilot coefficients can then be chosen which substantially matches the channel model. The set of pilot coefficients is then used by the receiver 304 for optimizing pilot symbol interpolation.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A multi-carrier modulation communications system for providing channel estimation comprising:
    a transmitter for inserting pilot symbols in a digital multi-carrier modulated radio frequency (RF) signal;
    a receiver for receiving the pilot symbols in a multi-carrier modulation RF signal, wherein the receiver performs the steps:
        detecting channel power gains from a plurality of designated pilot symbols;
        calculating a speed parameter (S) and a multi-path parameter (M) of the channel receiving the pilot symbols;
        defining a channel model based upon the speed parameter and multi-path parameter value;
        choosing a predefined set of pilot coefficients that substantially matches the channel model; and
        utilizing the set of pilot coefficients for optimizing pilot symbol interpolation.

2. A method for selecting an optimum set of pilot coefficients by estimating channel condition through a channel estimation scheme, comprising the steps of:
    detecting channel power gains from a plurality of designated pilot symbols;
    calculating a speed parameter (S) and a multi-path parameter (M) of the channel receiving the pilot symbols;
    defining a channel model based upon the speed parameter and multi-path parameter value;
    choosing a predefined set of pilot coefficients that substantially match the channel model; and
    utilizing the set of pilot coefficients for optimizing pilot symbol interpolation.

3. A method for selecting an optimum set of pilot coefficients as in claim 2, wherein the speed parameter is based upon the velocity of the channel receiving the pilot symbols.

4. A method for selecting an optimum set of pilot coefficients as in claim 2, wherein the multi-path parameter determines changes in frequency of the channel receiving the pilot symbols.

5. A method for selecting an optimum set of pilot coefficients as in claim 2, wherein the predefined set of pilot coefficients is selected to provide the lowest bit error rate (BER) based upon the speed parameter and multi-path parameter.

6. A method for estimating channel condition through a channel estimation scheme, comprising the steps of:
    detecting channel power gains from a plurality of designated pilot symbols;
    calculating a speed parameter (S) and a multi-path parameter (M) of channel receiving the pilot symbols;
    defining a channel model based upon the speed parameter and multi-path parameter value;
    choosing a predefined set of pilot coefficients that substantially match the channel model; and
    utilizing the set of pilot coefficients for optimizing pilot symbol interpolation.

7. A method for estimating channel condition as in claim 6, wherein the speed parameter is based upon the velocity of the channel receiving the pilot symbols.

8. A method for estimating channel condition as in claim 6, wherein the multi-path parameter determines changes in frequency of the channel receiving the pilot symbols.

9. A method for estimating channel condition in claim 6, wherein the predefined set of pilot coefficients is selected to provide the lowest bit error rate (BER) based upon the speed parameter and multi-path parameter.

* * * * *